United States Patent
Imaizumi et al.

[19]

[11] Patent Number: 5,805,303
[45] Date of Patent: Sep. 8, 1998

[54] IMAGE PROCESSING DEVICE

[75] Inventors: Shoji Imaizumi, Shinshiro; Takayuki Nabeshima; Shigeru Moriya, both of Toyokawa, all of Japan

[73] Assignee: Minolta Co., Ltd., Osaka, Japan

[21] Appl. No.: 666,691

[22] Filed: Jun. 18, 1996

[30] Foreign Application Priority Data

Jun. 20, 1995 [JP] Japan .................................. 7-153132

[51] Int. Cl.⁶ .......................... H04N 1/419; H04N 1/417; H04N 1/415
[52] U.S. Cl. .................. 358/433; 358/261.1; 358/261.2; 382/245
[58] Field of Search .............................. 358/261.1, 261.2, 358/261.3, 262.1, 430, 432, 433; 348/403, 420; 382/239, 245

[56] References Cited

U.S. PATENT DOCUMENTS

| 4,979,031 | 12/1990 | Tsuboi et al. | 358/518 |
| 5,119,182 | 6/1992 | Tsuboi et al. | 358/500 |
| 5,361,147 | 11/1994 | Katayama et al. | 358/462 |
| 5,576,845 | 11/1996 | Komatsu | 358/433 |

FOREIGN PATENT DOCUMENTS

| 4-144485A | 5/1992 | Japan . |
| 4-145765A | 5/1992 | Japan . |
| 4-157975A | 5/1992 | Japan . |
| 4-2200076A | 8/1992 | Japan . |
| 4-236568A | 8/1992 | Japan . |

*Primary Examiner*—Kim Yen Vu
*Assistant Examiner*—Kimberly A. Williams
*Attorney, Agent, or Firm*—Burns, Doane, Swecker & Mathis, LLP

[57] ABSTRACT

A method of image processing includes the steps of allocating image data of a document into a plurality of blocks of a predetermined pixel matrix; determining a gradient range exponent and a mean value information for each of the blocks based on the image data contained in each of the blocks; encoding the image data of each pixel of each of the blocks into code data based on the mean value information and gradient range exponent for the respective block so that the code data defines each pixel with fewer gradation levels than the image data; determining whether or not a mutually adjoining block is related to a solid image of a same density relative to a block subject to the encoding process; and executing a run length encoding process for a batch of mean value information, gradient range exponent, and code data based on a run length of adjoining blocks discriminated as related to a solid image of the same density.

24 Claims, 13 Drawing Sheets

IMAGE PROCESSING DEVICE

BACKGROUND OF THE INVENTION

1. Field of the Invention

The present invention relates to an image processing device for compression encoding of image information using a generalized block truncation coding (GBTC) method.

2. Description of the Related Art

In recent years the GBTC method has been proposed as a method for compressing and expanding document image data. The GBTC method executes processing to allocate image data of a document into blocks having a predetermined number of pixels, and compresses each block. Specifically, the pixel data within each block are quantized at a lower gradient level using gradient range exponent LD and mean value information LA calculated from the image data within each block. That is, the image data are converted to code data Φij obtained by quantization, with the result that the data quantity is compressed. Mean value information LA equally divides the sum of mean value Q1 of image data less than parameter P1 determined by image data within the block, and mean value Q4 of image data greater than parameter P1 (where P1<P2). Gradient range exponent LD is the difference between mean value Q4 and mean value Q1.

FIG. 1 illustrates the flow of the coding process using a typical GBTC method. First, the image data of the document image are divided into blocks of 4×4 pixels, as shown in FIG. 1(a).

Then the image data of each allocated block are extracted, and sid image data of each extracted block are subjected to an encoding process using the GBTC method. Each image data has a data quantity of 1 byte (1 byte=8 bits=256 halftones). In the encoding process using the GBTC method, data of 16-pixel blocks (i.e., 1×16 bytes=128 bits) within the allocated block are encoded (compressed) in 4-bytes of code data, a 1-byte gradient range exponent LD, and a 1-byte mean value information LA, as shown in FIG. 1(b). The 4-bytes of code data are obtained by sorting and allocating the data of each pixel in 4-levels (quantizing). That is, 2-bit code data become 4-bytes for the 16-pixel block.

As a result, the image data (16 bytes) within a single block are encoded as 6-bytes (48-bit) of data. That is, the quantity of data of an image is compressed to ⅜.

FIG. 1(c) shows the data quantity of coded image data corresponding to a 6-pixel block of image data before encoding. Decoding of the encoded data is executed by calculating the image data (1 byte) corresponding to each code data (2 bits) based on the gradient range exponent LD and mean value information LA.

The image data of the 16 pixels Xij (i.e., i,j=1, 2, 3, 4) within the 4×4-pixel block are replaced by the four types of data (1 byte) among the 256 halftones via the decoding process. The decoded data contain obvious errors when compared to the data of the original document image. These errors are difficult to discern, however, due to the limitations of human visual acuity. That is, there is virtually no discernable loss of image quality in normal images.

Parameters Q1 and Q4 can be determined from the gradient range exponent LD and mean value information LA contained in the coded data. That is, a text image comprising a black color portion below parameter P1 and white color portion above parameter P2 can be reproduced from the coded data.

In the JPEG (Joint Photographic Experts Group) method of Huffman coding of data obtained by DCT (discrete cosine transform) conversion of image data, the data compression rate varies depending on the type of document. That is, although the JPEG method may realize a higher rate of data compression than the GBTC method on a particular document, the JPEG method may not be capable of any compression of another document. Thus, it is difficult to set the capacity of installed memory in image forming apparatuses using the JPEG method. On the other hand, the GBTC method is capable of compressing data at a normally constant compression rate. Therefore, image forming apparatuses using the GBTC method are advantageous in that the capacity of installed memory can be readily set.

Encoding of image data by the GBTC method is normally expressed as a constant data compression rate. This compression rate, however, is not a high value compared to the image data compression rate achievable by the JPEG method.

OBJECTS AND SUMMARY

An object of the present invention is to eliminate the previously described disadvantages.

A further object of the invention is to provide an image processing device for executing an image data compression process of greater efficiency.

Another object of the present invention is to provide an image processing device for compressing image data compressed by encoding via the GBTC method.

Still another object of the present invention is to provide an image processing device provided with a compression function of excellent efficiency by compressing image data compressed by encoding via the GBTC method in accordance with the type of image.

These and other objects are attained by an image processing device provided with an encoding processing unit for allocating image data of a document in blocks of a predetermined pixel matrix and determining the gradient range exponent and mean value information from image data contained in each block, and quantizing data of each pixel in a block at a gradient level less than the original image data based on said mean value information and gradient range exponent; a discrimination unit for determining whether or not mutually adjoining blocks are related to solid images of the same density relative to a block subject to the encoding process; and a run length encoding process unit for executing a run length encoding process for a batch of mean value information, gradient range exponent, and code data based on the run length of a block discriminated as related to a solid image of the same density.

The aforesaid objects are attained by an image processing device provided with an encoding processing unit for allocating image data of a document in blocks of a predetermined pixel matrix and determining the gradient range exponent and mean value information from image data contained in each block, and quantizing data of each pixel in a block at a gradient level less than the original image data based on said mean value information and gradient range exponent; a discrimination unit for determining whether or not mutually adjoining blocks are related to solid images of the same density relative to a block subject to the encoding process; a run length encoding process unit for executing a run length encoding process for a batch of mean value information, gradient range exponent, and code data based on the run length of a block discriminated as related to a solid image of the same density; a memory unit for storing compression data and run length data obtained by the run length encoding process, and a comparator unit for comparing the total value of the run length data and compressed data obtained by the run length encoding process with the mean value information, gradient range exponent, and code data of each block prior to the run length encoding process, and a means for storing in a memory unit the mean value information, gradient range exponent, and code data for each block prior to the run length encoding process when the total value of the run length data and the compressed data obtained by the run length encoding process is greater than the total value of the mean value information, gradient range exponent, and code data of each block prior to the run length encoding process based on the comparison result of said comparator unit.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

A preferred embodiment of the digital color copying apparatus of the present embodiment discriminates whether or not image data is related to a black-and-white solid image in process block units after a GBTC method encoding process has been executed. Blocks discriminated as related to a black-and-white solid image are subjected to determination of the number of consecutive solid images of identical density, i.e., run length. These consecutive blocks of identical density are subjected to a run length encoding process, and the data encoded by the GBTC method are compressed.

The digital color copying apparatus of the present embodiment is described hereinafter in the following sequence and with reference to the accompanying drawings.
(1) GBTC method image data encoding/decoding processes
(2) Digital color copying apparatus construction
(3) Run length compression encoding process
(3) Image processing
  (3-1) Main routine
  (3-2) Image encoding process
  (3-2-1) Image encoding process
  (3-2-2) Run length encoding process
  (3—3) Image decoding process (1) GBTC Method Encoding/Decoding Processes The GBTC method allocates image data of a document into blocks having a predetermined number of pixels, and subjects said image data of each block to a compression process. Specifically, the data of each pixel within a block are quantized to fewer gradient levels using the mean value information LA and gradient range exponent LD calculated from the image data in each block. That is, the various image data are converted to code data $\Phi_{ij}$ obtained by quantization, with the result that the information quantity is compressed. Mean value information LA equally divides the sum of mean value Q1 of image data less than parameter P1 determined by image data within the block, and mean value Q4 of image data greater than parameter P1 (where P1<P2). Gradient range exponent LD is the difference between mean value Q4 and mean value Q1.

Figure 1:
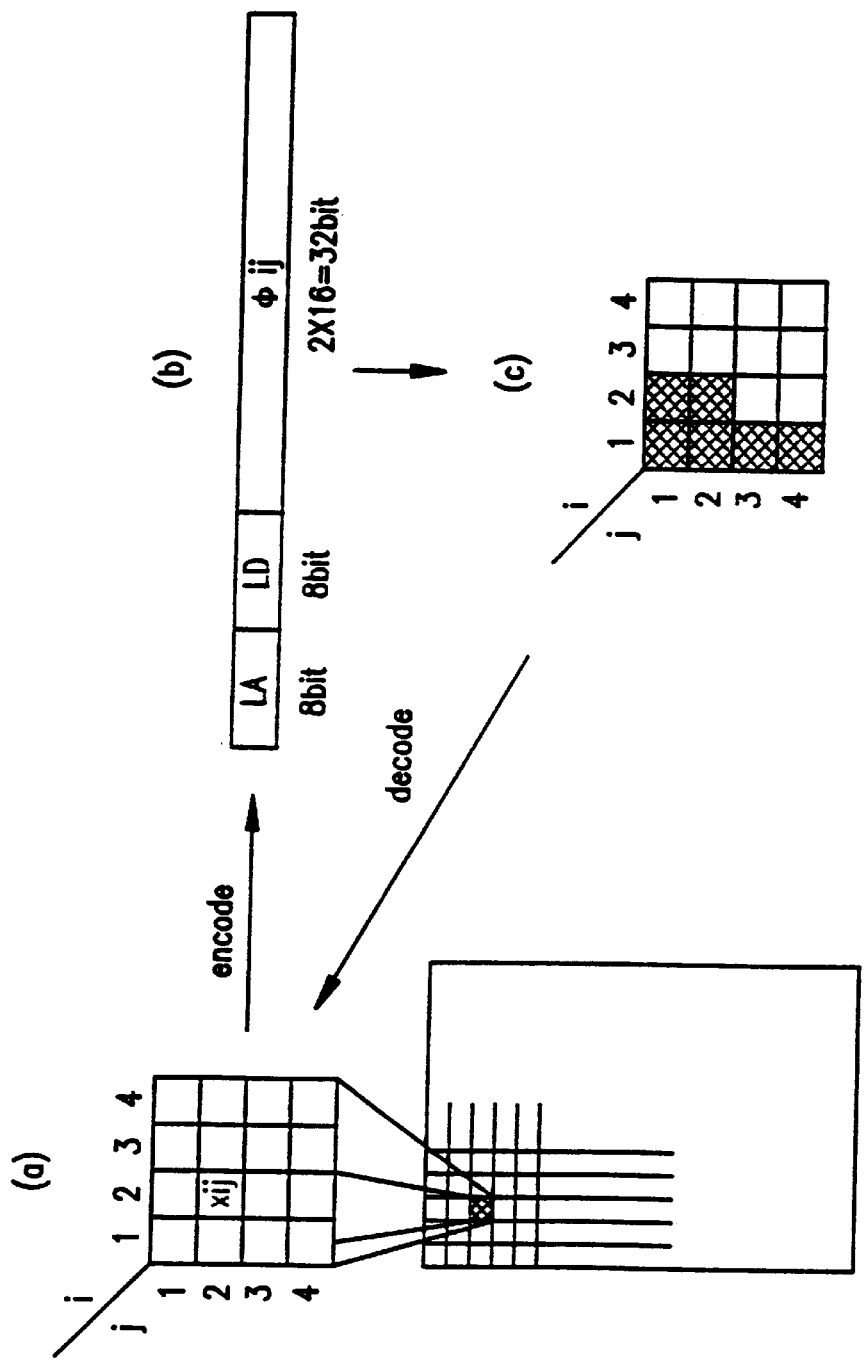
FIGS. 1(a), 1(b), 1(c) show the flow of the GBTC method encoding process.

FIG. 1 illustrates the general flow of the GBTC method encoding process. First, the image data of the document image are allocated in blocks of 4×4 pixels, as shown in FIG. 1(a). Then, image data are extracted from each allocated block, and the image data extracted from the block is subjected to a GBTC method encoding process. The image data have a data quantity of 1 byte (1 byte=8 bits=256 halftones). In this GBTC method encoding process, 16-pixel block data (1×16 bytes=128 bits) within the aforesaid block are encoded (compressed) to a 1-byte gradient range exponent LD, a 1-byte mean value information LA, and 4-bytes of code data, as shown in FIG. 1(b). The 4-bytes of code data are obtained by sorting and allocating the data of each pixel in 4-levels (quantizing). That is, 2-bits of code data become 4-bytes in the 16-pixel block.

As a result, the image data (16 bytes) within a single block are encoded as 6-bytes (48-bit) of data. The quantity of data of an image is compressed to ⅜.

FIG. 1(c) shows the data quantity of coded image data corresponding to a 6-pixel block of image data before encoding. Decoding of the encoded data is executed by calculating the image data (1 byte) corresponding to each code data (2 bits) based on the gradient range exponent LD and mean value information LA.

In the present embodiment, document image data are extracted in block units of 4×4 pixels. The present invention is not limited to this arrangement, however, inasmuch as block units of other sizes, such as 3×3 pixels, or 6×6 pixels may be extracted. Furthermore, the present invention is not limited to encoding the 256 halftone data of each pixel within a block as 4-level code data, inasmuch as said 256 halftone data may be encoded to other levels, such as 2-level, or 8-level code data. The image forming apparatus of the present invention is characterized by executing various image forming processes based on discrimination of image attributes and discrimination results using the mean value information LA and gradient range exponent LD determined from parameters P1 and P2 determined from image data within each block, as described below.

Figure 2:
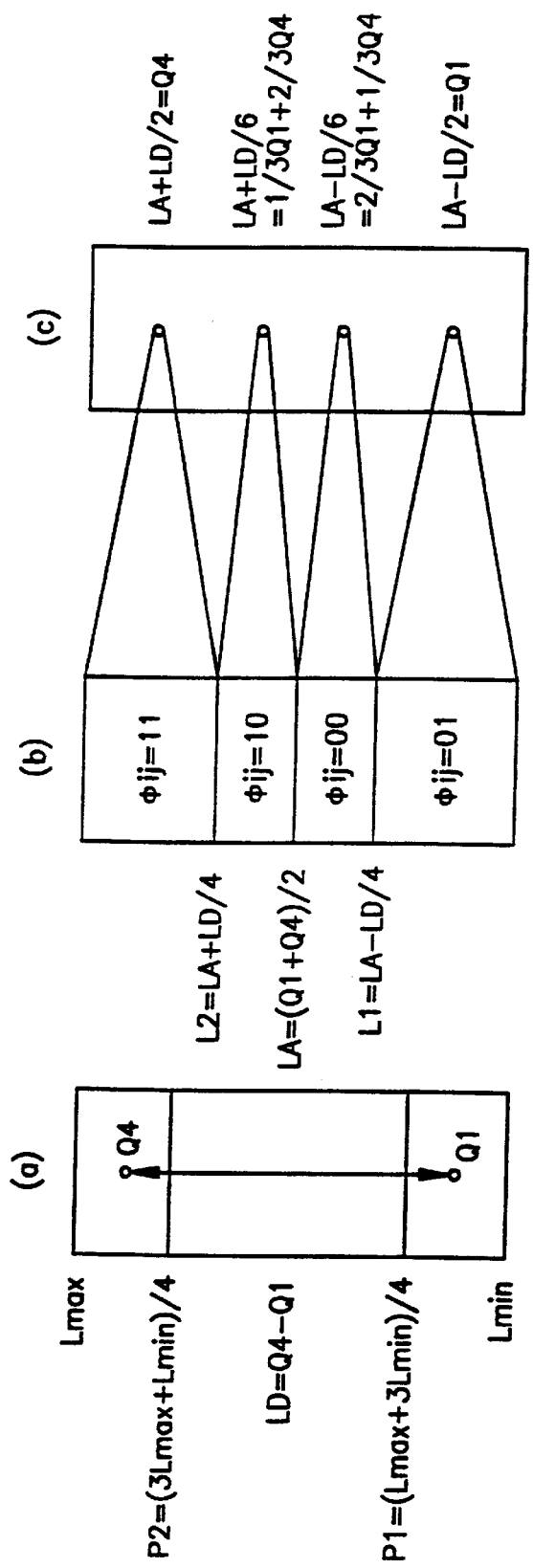
FIGS. 2(a), 2(b), 2(c) show the GBTC method encoding process.

FIGS. 2(a) through 2(c) illustrate the GBTC method encoding/decoding processes. FIG. 2(a) shows the relationships among the maximum image data Lmax within a block, minimum image data Lmin within a block, parameters P1 and P2, and gradient range exponent LD. A predetermined characteristics feature quantity required for encoding is determined from image data extracted in block units of 4×4 pixels. The feature quantity is determined by the following calculations. First, the maximum value Lmax and minimum value Lmin of the image data (8-bit) within a block are detected. Then, ¼ of the difference of the maximum value Lmax and minimum value Lmin is added to the minimum value Lmin to determine parameter P1, and ¾ of said difference is added to the minimum value Lmin to determine parameter P2. Parameters P1 and P2 are determined by Equation 1 and Equation 2 below.

$$P1=(Lmax+3Lmin)/4 \quad \text{Eq. 1}$$

$$P2=(3Lmax+Lmin)/4 \quad \text{Eq. 2}$$

Then, the mean value Q1 of the image data pixels less than parameter P1 is determined from the image data within the block. Mean value Q4 of the image data pixels greater than parameter P2 is determined from image data within the block. The mean value information LA (LA=(Q1+Q4)/2) and the gradient range exponent LD (LD+Q4−Q1) are determined based on the previously determined mean values Q1 and Q4. Then, reference values L1 and L2 are determined by calculation using Equations 3 and 4.

$$L1=LA-LD/4 \quad \text{Eq. 3}$$

$$L2=LA+LD/4 \quad \text{Eq. 4}$$

The reference values L1 and L2 are used to render the mean value information LA and the 1-byte (8-bit) pixel data, i.e., the 256 halftone image data, as 2-bit image data, that is, to encode said data as 4-level code data.

Then, codes are allocated for all image data. FIG. 2(b) shows the value of code data $\Phi ij$ allocated according to the image data of pixel Xij of column i (where i=1, 2, 3, 4) and line j (where j=1, 2, 3, 4) in the block. More specifically, the 2-bit code data $\Phi ij$ is allocated in accordance with the value of pixel Xij as described below.

When $Xij \leq L1$, $\Phi ij=01$

When $L1 < Xij \leq LA$, $\Phi ij=00$

When $LA < Xij \leq L2$, $\Phi ij=10$

When $L2 < Xij$, $\Phi ij=11$

The data encoded by the GBTC method comprises code data (16×2 bit) of the 16-pixel block, and the 1-byte (8-bit) data of the gradient range exponent LD and mean value information LA.

As shown in FIG. 2(c), when the code data are decoded, the aforesaid gradient range exponent LD and mean value information LA are used. That is, the data of Xij are substituted for the 256 halftone data as shown below in accordance with the code data $\Phi ij$ allocated for pixel Xij.

When $\Phi ij=01, Xij=LA-LD/2=Q1$

When $\Phi ij=00, Xij=LA-LD/6=2/3Q1+1/3Q4$

When $\Phi ij=10, Xij=LA+LD6=1/3Q1+2/3Q4$

When $\Phi ij=11, Xij=LA+LD/2=Q4$

The image data of the 16 pixels of Xij within the 4×4 pixel block are substituted by the four levels of data (1-byte) among the 256 halftones via the decoding process. The various decoded data include obvious errors when compared to the data of the original document image. These errors are difficult to discern, however, due to the limitations of human visual acuity. That is, there is virtually no discernable loss of image quality in normal images.

Parameters Q1 and Q4 can be determined from the gradient range exponent LD and mean value information LA contained in the coded data. That is, a text image comprising a black color portion below parameter P1 and white color portion above parameter P2 can be reproduced from the coded data.

In the JPEG (Joint Photographic Experts Group) method of Huffman coding of data obtained by DCT (discrete cosine transform) conversion of image data, the data compression rate varies depending on the type of document. That is, although the JPEG method may realize a higher rate of data compression than the GBTC method on a particular document, the JPEG method may not be capable of any compression of another document. Thus, it is difficult to set the capacity of installed memory in image forming apparatuses using the JPEG method. On the other hand, the GBTC method is capable of compressing data at a normally constant compression rate. Therefore, image forming apparatuses using the GBTC method are advantageous in that the capacity of installed memory can be readily set.

(2) Digital Full Color Copying Apparatus (2-1) Construction

Figure 3:
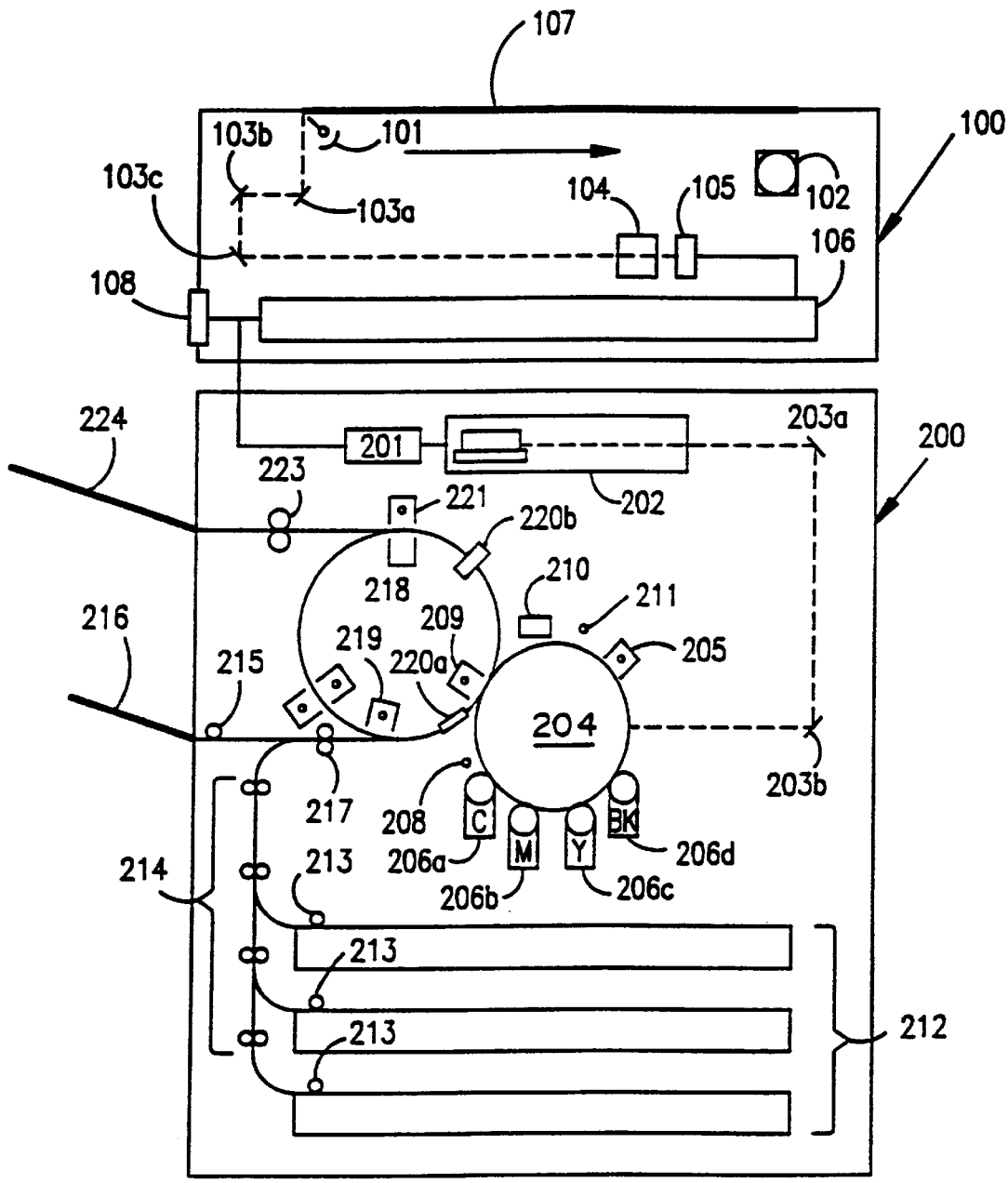
FIG. 3 is a section view showing the construction of a digital color copying apparatus.

FIG. 3 is a section view showing the construction of a digital full color copying apparatus. This digital full color copying apparatus is broadly divided into an image reading unit 100 for reading RGB image data of a document, and a copying unit 200.

In image reading unit 100, a document placed on glass document platen 107 is irradiated by an exposure lamp 101. The light reflected from the document is directed to a lens 104 by three mirrors 103a, 103b, and 103c, and forms an image on charge-coupled device (CCD) sensor 105. The exposure lap 101 and mirror 103a move in accordance with the set magnification at a speed V in the arrow direction (subscan direction) via a scanner motor 102. Thus, the document placed on the document platen is scanned across its entire surface. The mirrors 103b and 103c move in the arrow direction (subscan direction) at a speed V/2 in conjunction with the movement of exposure lamp 101 and mirror 103a in the same arrow direction. The multilevel electric signals of the three RGB colors obtained by CCD sensor 105 are converted to 8-bit halftone data by read signal processing unit 106. Thereafter, the converted image data are output to copy unit 200 via external output port 108.

In copy unit 200, image data correction unit 201 accomplishes halftone correction (gamma correction) of the input halftone data in accordance with the tone characteristics of the photosensitive member. Printer exposure unit 202 accomplishes digital-to-analog (D/A) conversion of the corrected image data, generates laser diode drive signals, and drives a semiconductor laser via said drive signals.

The laser beam emitted from printer exposure unit 202 in accordance with the image data irradiates the rotatably driven photosensitive drum 204 via reflecting mirrors 203a and 203b. Photosensitive drum 204 is irradiated by eraser lamp 211 before image exposure of each single copy, and is uniformly charged by charger 205. When the drum 204 is optically exposed in this state, an electrostatic latent image of the document is formed on the surface of photosensitive drum 204. Only one among the cyan (C), magenta (M), yellow (Y), and black (BK) toner developing devices 206a through 206d is selected, and develops the electrostatic latent image formed on the surface of photosensitive drum 204. After surplus charge is eliminated by eraser 208 prior to transfer, the developed toner image is transferred to a copy sheet wrapped around the transfer drum 218.

Transfer drum 218 has a transfer film on its surface, and rotates in a counterclockwise direction at the same speed as the rotation speed of the photosensitive member. A reference panel 220a is provided on the interior side of transfer drum 218 to synchronize the copy sheet home position and the image transfer position. Reference position sensor 220b generates a predetermined reference signal whenever reference panel 220a intersects said sensor 220a in accordance with the rotation of transfer drum 218. The copy sheet is fed from paper cassette units 212 to the transport path via take-up roller 213, and transported to timing roller 217 via feed roller 214. When a copy sheet is inserted in manual tray 216, it is fed to timing roller 217 via feed roller 21 5. Timing roller 217 supplies a copy sheet to transfer drum 218 synchronously with the aforesaid reference signal, and holds the copy sheet at a predetermined position on transfer drum 218. The copy sheet supplied to transfer drum 218 from timing roller 217 is electrostatically adhered to transfer drum 218 by charger 219.

The aforesaid printing process is repeated for the four colors yellow (Y), magenta (M), cyan (C), and black (BK). At this time, photosensitive drum 204, exposure lamp 101 in synchronization with the operation of transfer drum 218, and mirrors 103a, 103b, and 103c repeat predetermined operations.

Thereafter, the copy sheet is separated from transfer drum 218 by eliminating the charge electrostatically holding the copy sheet via a release charger pair 221. The copy sheet released from transfer drum 218 is subjected to a fixing process by a pair of fixing rollers 223, and is subsequently ejected to discharge tray 224.

Figure 4:
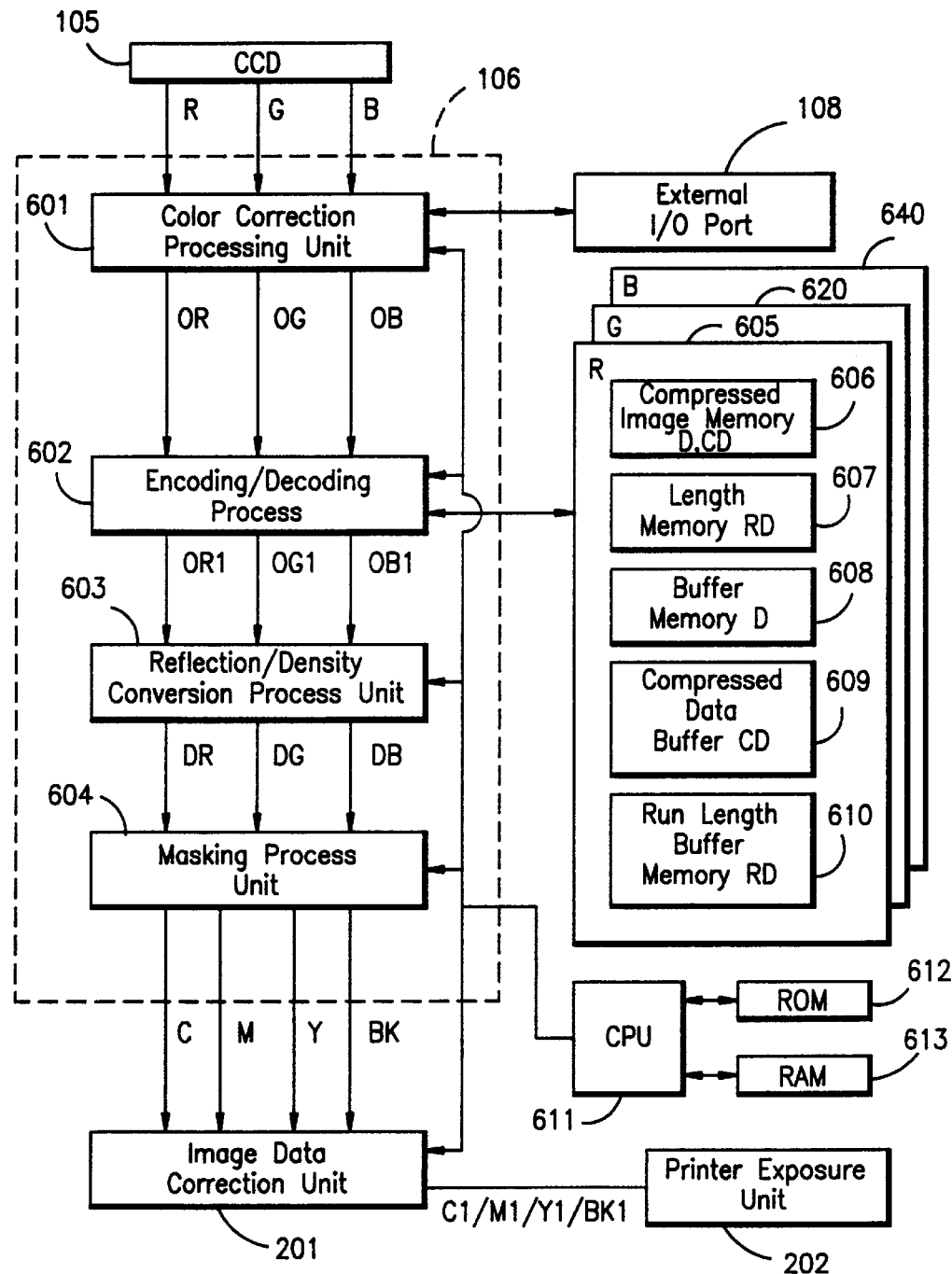
FIG. 4 is a block diagram showing the flow of image processing.

FIG. 4 is a block diagram showing the flow of the processing of read image signals. The various process sections of read signal process unit 106 are connected via CPU 611. Connected to CPU 611 are ROM 612 which stores control programs and the like, and RAM 613 which is used as a work area for control process execution.

The R, G, B image data read by CCD sensor 105 contain variations caused by individual solid state differences among CCD sensors 105. Thus, the values of read data may differ even when reading a standard pattern of the same color chart. In reading device color correction processing unit 601, the read RGB image data are corrected to standard RGB image data which are standardized by the National Television system Committee (NTSC) Standards, High Definition Television Standards (HDTV) or the like. In reading device color correction processing unit 601, the corrected image data OR, OG, OB are output to encoding/decoding process unit 602 as well as output to I/O port 108.

Peripheral devices connected to the copying apparatus may receive the OR, OG, OB image data of the document via external I/O port 108.

In addition, this copying apparatus is capable of forming images using said OR, OG, OB image data input from a peripheral device via external I/O port 108. In such circumstances, the copying apparatus functions as a printer. This function is possible because the various processes of reading device color correction processing unit 601, are set to use standardized RGB image data.

In encoding/decoding process unit 602, the OR, OG, OB image data are subjected to a GBTC type encoding process, after which a run length encoding process is executed. Encoding/decoding process unit 602 is connected to memories 605, 620, and 640 which store R, G, B image data. The internal construction of these memories are identical.

R image data memory 605 comprises a compressed image memory 606 for storing compressed data CD obtained by run length encoding process or code data obtained by a GBTC type encoding process, a run length memory 607 for storing run length data RD obtained by the run length encoding process, buffer memory 608 for storing 1-block line of code data after GBTC compression, compressed data buffer 609 for storing data obtained by the run length encoding of data within buffer memory 608, and buffer memory 610 for storing run length data obtained by run length encoding of data within buffer memory 608. The run length encoding process is described later.

When, for example, R data are decoded in encoding/decoding process unit 602, compressed data CD and run length data RD are read out from compressed image memory 606 and run length memory 607, and the encoded data D are restored based on said read data. The OR1, OG1, and OB1 image data are restored by executing a GBTC type decoding process based on the R, G, B color data. In encoding/decoding process unit 602, the contents of the encoding and decoding processes performed on the R, G, B data are identical. The OR1, OG1, OB1 data obtained by the decoding process are input to reflection/density conversion process unit 603. The reflection/density conversion process unit 603 executes a predetermined reflection/density conversion process relative to the RGB image data of OR1, OG1, OB1, and thereafter outputs density data DR, DG, DB. The RGB image data converted to density data are then converted to cyan (C), magenta (M), yellow (Y), or black (BK) color image data in masking process unit 604, and are thereafter output to image data correction unit 201. In image data correction unit 201, the gradient data output from masking process unit 604 are subjected to a predetermined gradient correction (gamma correction) process, and thereafter said gradient data are output to printer exposure unit 202.

(3) Run Length Compression Encoding Process

This copying apparatus discriminates whether or not the image data related to a block encoded by the GBTC method is a black-and-white solid image. When the discrimination result is a block identified as being related to a black-and-white solid image and solid images of the same density are consecutive, the number of consecutive images is designated the run length, and run length encoding process is executed. When the compression ratio of the code data obtained by the run length encoding process is compared to the compression ratio of the data obtained by the GBTC method encoding process and the compression ratio of the compressed data obtained by the run length encoding process is higher, these data are used. Thus, greater compression of the image data is realized.

Figure 5:
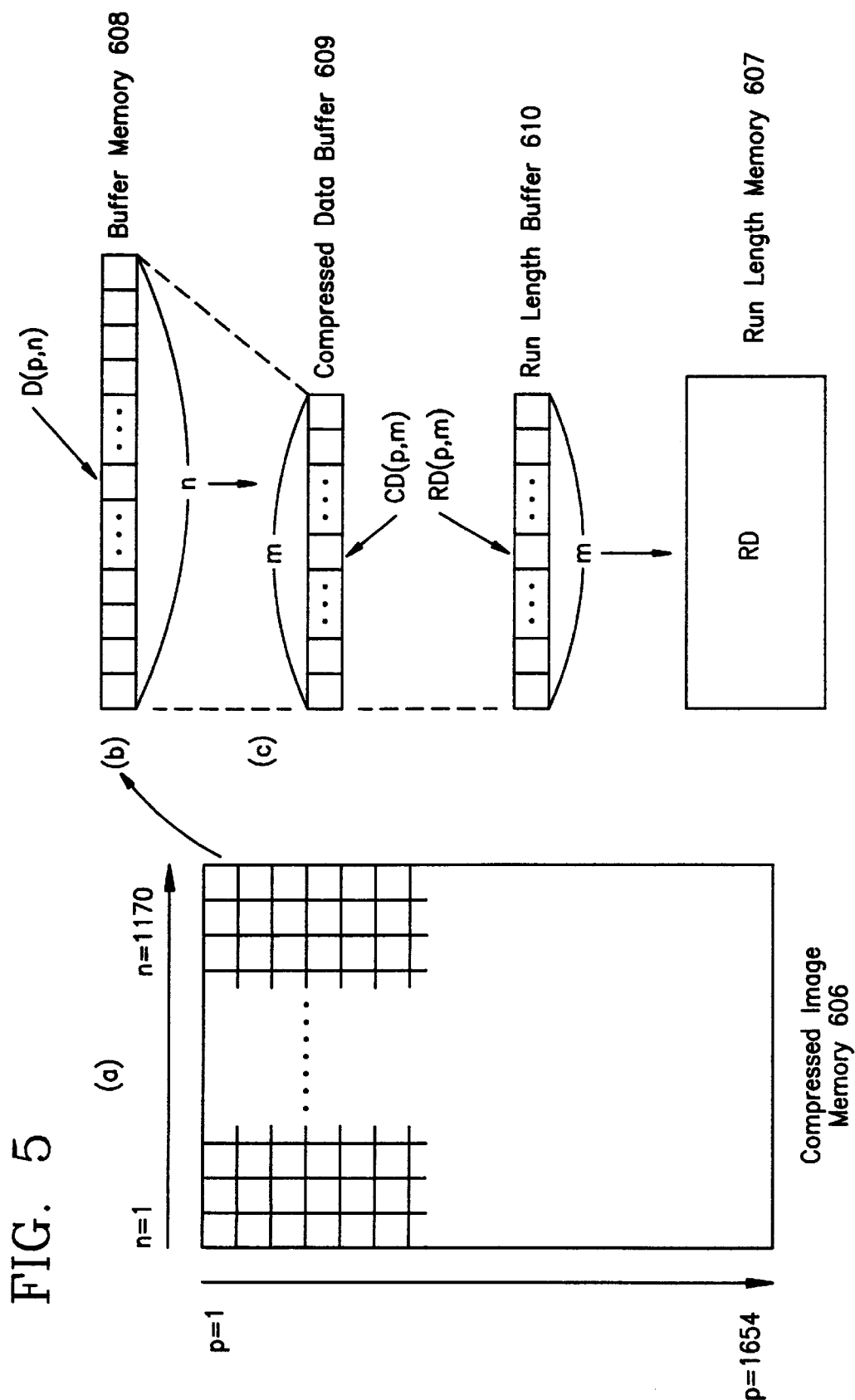
FIG. 5 shows the flow of the run length encoding process.

FIG. 5 illustrates the flow of the run length encoding process. FIG. 5(a) shows image data allocated in 1654×1170 blocks (vertical-by-horizontal) via the GBTC method encoding process. Hereinafter, the code data (mean value information LA, gradient range exponent LD, and code data Φij) of line p and column n of the block are expressed as D(p,n). The conditions of $1 \leq p \leq 1654$, $1 \leq n \leq 1170$ are satisfied.

As shown in FIG. 5(b), data D(p,1) through data D(p,1170) of each block of line p are extracted. Actual processing checks whether or not a block is related to a black-and-white solid image in the block sequence beginning with the first column. When a block is discriminated as being related to a black-and-white solid image and mutually consecutive blocks have the same density, the code data of the blocks are stored as a batch of a plurality of consecutive data.

FIG. 5(c) shows the compressed code data CD(p,m) and run length data RD(p,m) obtained by the run length encoding process for all blocks of line p. The value of coefficient m of the data is a value less than n.

Figure 6:
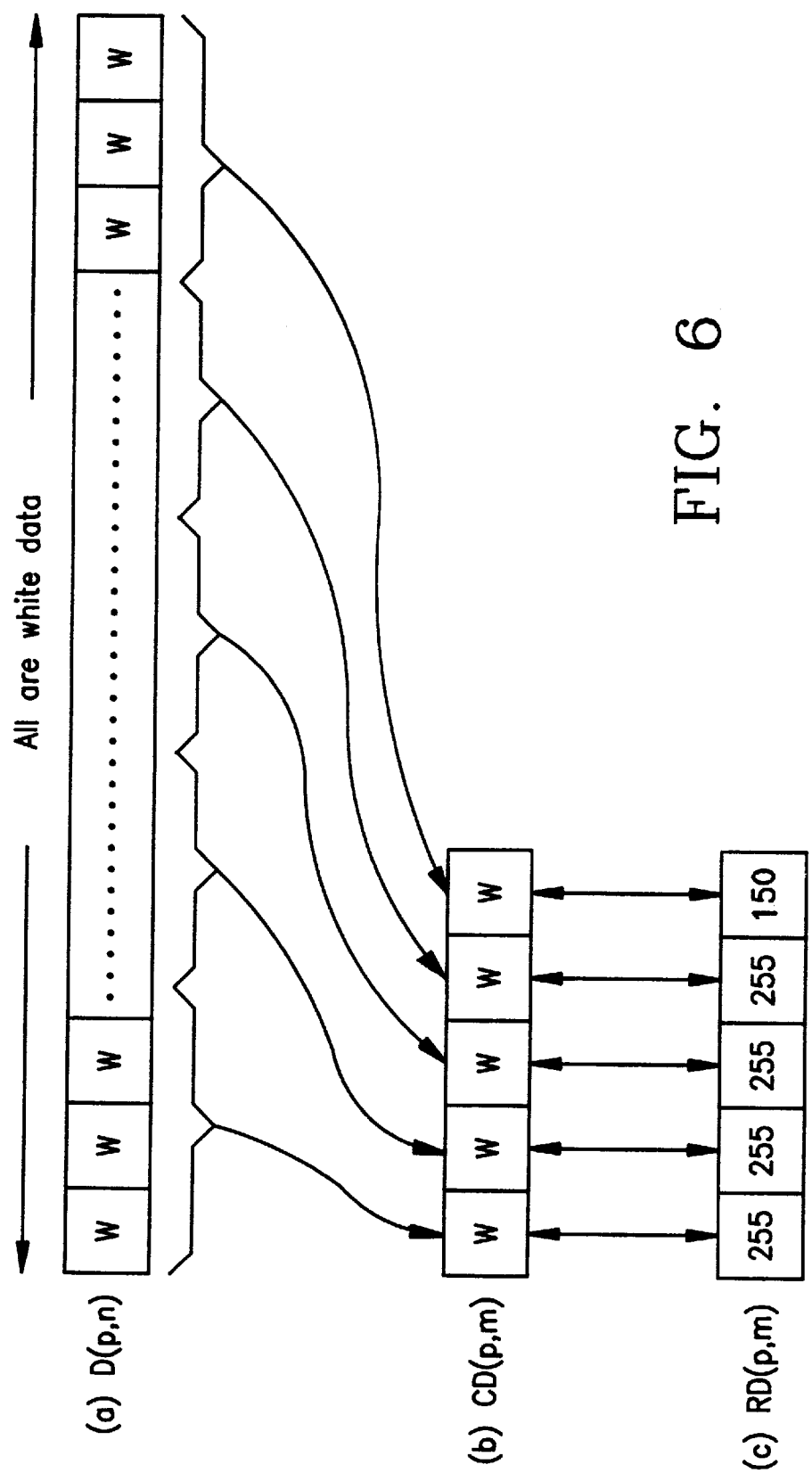
FIGS. 6, 7, and 8 show the relationships among encoded data D, compressed data CD, and run length data RD.

FIG. 6 shows the relationships among encoded data D(p,n), compressed code data CD(p,m) obtained by the run length encoding process, and run length data RD(p,m) when all blocks of line p are related to a white solid image. The data of all blocks of line p obtained by the execution of the run length encoding process are expressed as 6-byte compressed data CD(p,m) expressing the white solid image, and the run length data RD(p,m) expressing the total run length of said data of 1170. The value of n is 1 through 1170, and the value of m is 1 through 5.

FIG. 6(a) shows encoded data D(p,n) of all blocks of line p related to a white solid image. The data D(p,n) are 6-bytes of data (i.e., mean value information LA, gradient range exponent LD, code data Φij) per block expressing the white solid image; the mean value information LA is expressed as 0×ff, the gradient range exponent LD is expressed as 0×00, and code data Φij is expressed as 0×00,0×00,0×00 0×00. Since the value 0× clearly expresses a hexadecimal number, is it appended to the front of the value; hereinafter the same. The total data D(p,n) before run length encoding are 6-bytes by 1170 blocks by three RGB colors (i.e., 6 bytes×1170×RGB)=21,060 bytes.

FIG. 6(b) shows the compressed data CD(p,m) obtained by the run length encoding process. Compressed data CD(p,1 ) are 6-bytes of data (mean value information, gradient range exponent, code data Φij) expressing a white solid image. Mean value information LA of the blocks related to a white solid image is expressed as 0×ff, gradient range exponent LD is expressed as 0×00, and code data Φij are expressed as 0×00,0×00,0×00,0×00. The encoded data D(p,n) shown in FIG. 6(a) are subjected to run length encoding process to obtain the total compressed data CD(p, m) which are 6-bytes by 5 blocks by three RGB colors (i.e., 6 bytes×5×RGB)=90 bytes. The rendering of compressed data CD as 5-bytes of data is accomplished by the relationship with the run length data RD described below.

FIG. 6(c) shows the run length data RD(p,m) in paired correspondence with compressed data CD(p,m). Run length data RD(p,1 ) are 1-byte of data, and are expressed by allocating the run length in 255 units when a white solid image comprises 255 or more consecutive blocks. The 1-byte data expressing the run length of 255 is 0×ff. Accordingly, when there are 1170 consecutive blocks related to a white solid image, the run length data is expressed by a total of 5 bytes comprising the 4-bytes of data RD(p,1 ) through RD(p,4) of value 0×ff, and the 1-byte data RD(p,5) of value 0×96.

As previously described, the total of the run length data RD(p,m) obtained by the run length encoding process are 1-byte by 5 blocks by three RGB colors (i.e., 1 byte×5× RGB)=15 bytes. That is, when the encoded data D(p,n) shown in FIG. 6(a) are subjected to run length encoding, the encoded data D(p,n) are compressed to 7/1404 (i.e., about 0.5%). Since the compression ratio of data encoded by the GBTC method is 3/8 (about 37%), the compression ratio is greatly improved to 7/3744 (about 0.2%) by executing the run length encoding process.

Figure 7:
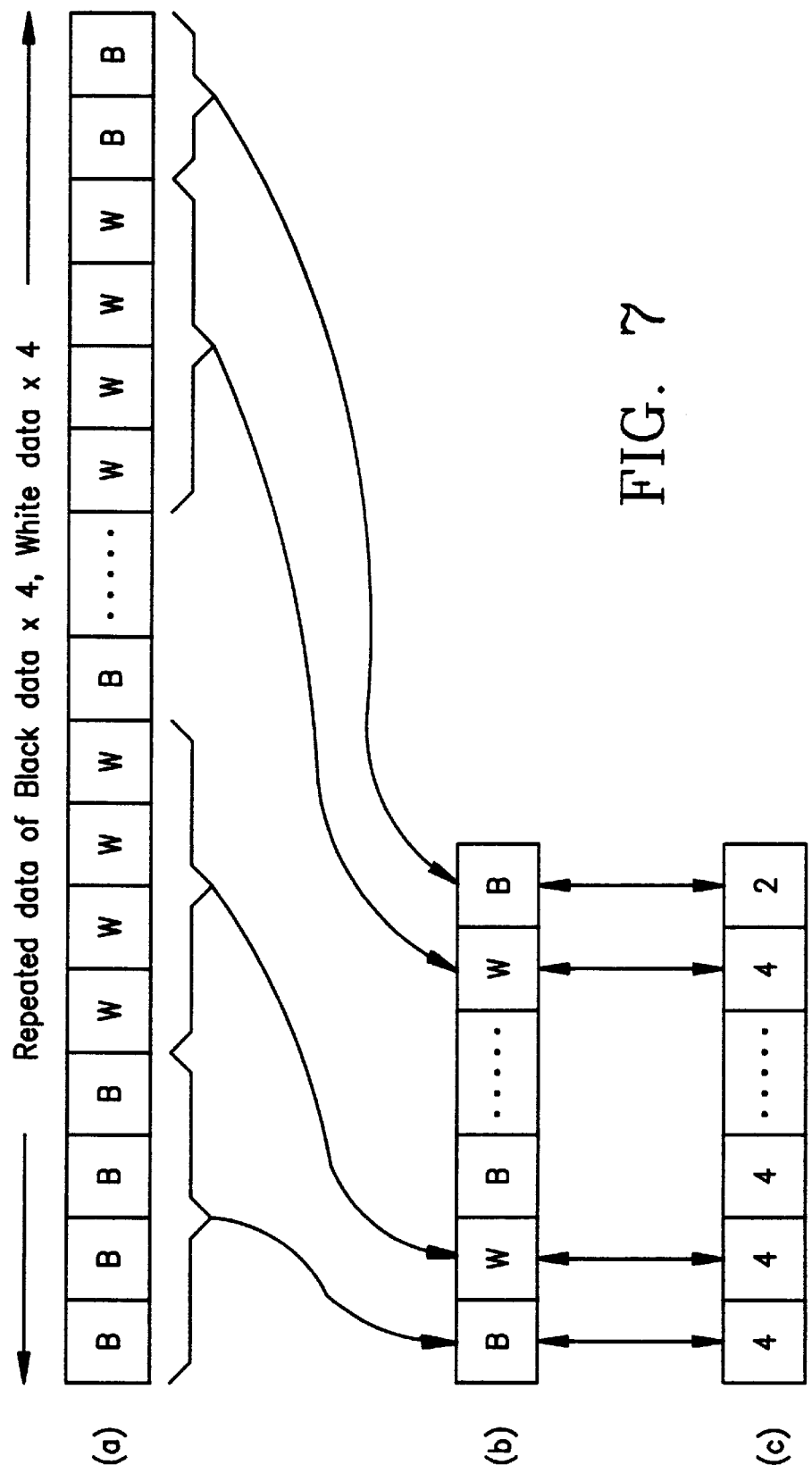

FIG. 7 shows the relationships among data D(p,n) encoded when white solid images and black solid images are repeated in an array of 4-block units in line p, and compressed data CD(p,m) and run length data RD(p,m) obtained by the run length encoding process. Data D(p,n) arrayed in 4-block units in line p are expressed by 6-bytes of compressed data CD(p,m) expressing the black solid image and the white solid image, respectively, and run length data RD(p,m) expressing a run length of 4, respectively, via the run length encoding process. The value n is a value of 1 to 1170, and the value m is a value of 1 to 293.

FIG. 7(a) shows data D(p,n) related to black solid images and white solid images in an array of alternating 4-block units. The 6-bytes of data D(p,n) expressing the black solid image are mean value information LA value of 0×00, gradient range exponent LD value of 0×00, and code data Φij value of 0×00,0×00,0×00,0×00. The 6-byte data D(p,m) expressing the white solid image are mean value information LA value of 0×ff, gradient range exponent LD value of 0×00, and code data Φij value of 0×00, 0×00,0×00,0×00. The total of the data D(p,n) before run length encoding is 6 bytes by 1170 blocks by three RGB colors (i.e., 6 bytes×1170×RGB) =21,060 bytes.

FIG. 7(b) shows compressed data CD(p,m) obtained when the run length encoding process was executed. The compressed data CD(p,m) are data expressing black solid images and data expressing white solid images which are alternatingly repeated. The mean value information LA of compressed data CD(p,1) expressing a black solid image is a value of 0×00, the gradient range exponent LD is a value of 0×00, and the code data Φij is a value of 0×00,0×00,0×00, 0×00. The mean value information LA of compressed data CD(p,2) expressing a white solid image is a value of 0×ff, the gradient range exponent LD is a value of 0×00, and the code data Φij is a value of 0×00,0×00,0×00,0×00. The encoded data D(p,n) shown in FIG. 7(a) has a total compressed data CD(p,m) obtained by run length encoding of 6 bytes by 293 blocks by three RGB colors (i.e., 6 bytes× 293×RGB)=5,274 bytes.

FIG. 7(c) shows 1-byte run length data RD(p,m) in paired correspondence with compressed data CD(p,m). The value of the 1-byte run length data RD(p,m) expressing a run length of 4 is 0×04. Since 1170 individual blocks are arrayed in line p, at the end of the line the blocks relating to a black solid image are not 4 blocks, but rather 2 blocks. Accordingly, the value of run length data RD(p,293) is 0×02. The total run length data RD(p,m) obtained by the run length encoding of code data D(p,n) shown in FIG. 7(a) is 1 byte by 293 blocks by 3 RGB colors (i.e., 1 byte×293×RGB)=879 bytes.

Therefore, when the encoded data D(p,n) shown in FIG. 7(a) are subjected to run length encoding, the encoded data D(p,n) are compressed at a ratio of 2051/7020 (about 20%). Since the compression ratio of data encoded by the GBTC method is 3/8 (about 37%), the improved compression ratio achieved by the execution of the run length encoding process is 2051/18720 (about 11%).

Figure 8:
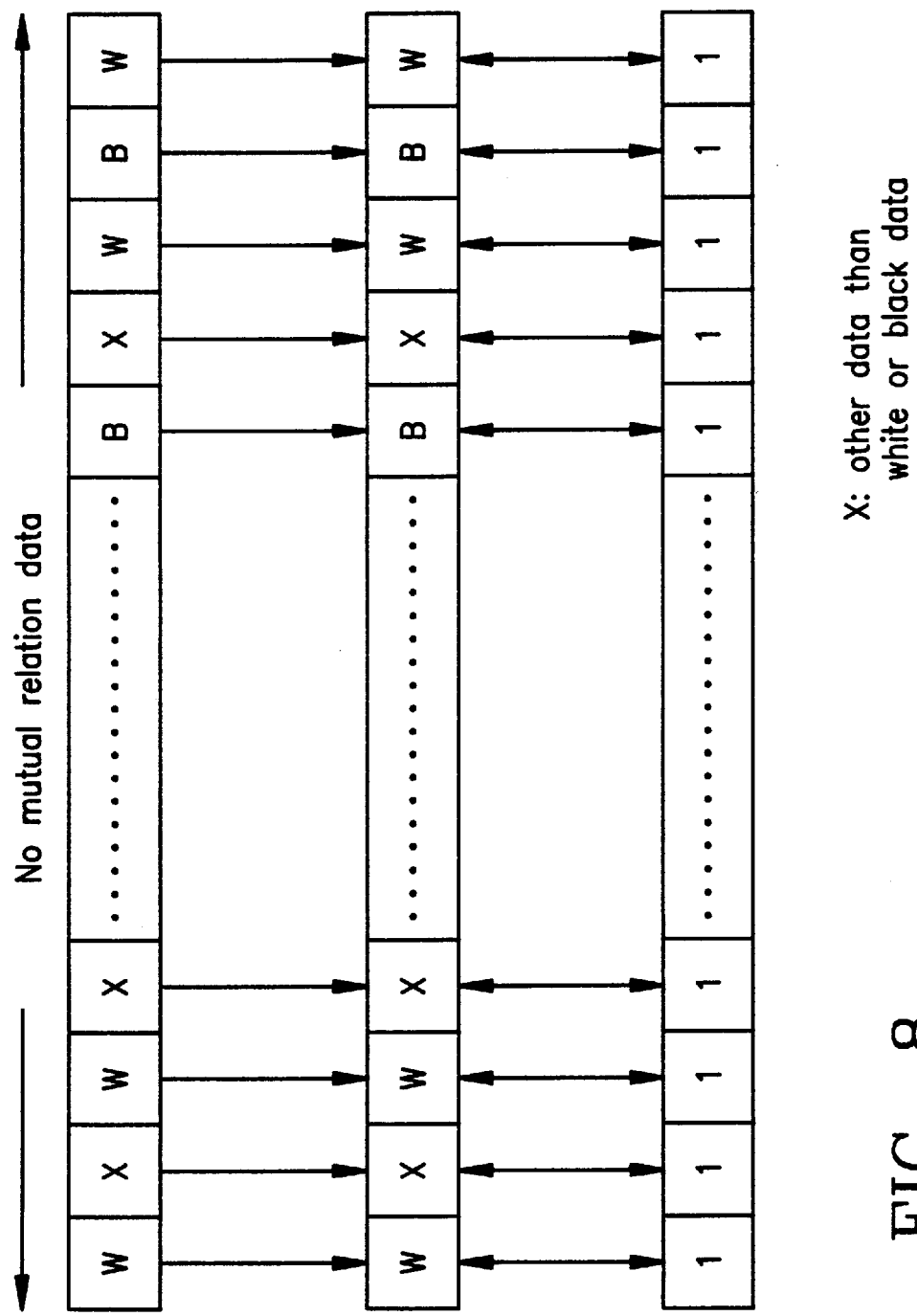

FIG. 8 shows the relationships among data D(p,n) encoded when there is no mutual relationship among blocks of line p, and compressed data CD(p,m) and run length data RD(p,m) obtained by the run length encoding process.

FIG. 8(a) shows a relationship of among unrelated independent blocks of data D(p,n). That is, in the block arrayed in line p, there are no instances of two or more consecutive white solid images or two or more consecutive black solid images. The encoded data of each block comprises 1-byte mean value information LA, 1-byte gradient range exponent LD, and 4-byte code data Φij. Therefore, the total of data D(p,n) prior to run length encoding is 6-bytes by 1170 blocks by three RGB colors (6-bytes×11170×RGB)=21,060 bytes.

FIG. 8(b) shows compressed data CD(p,m) obtained when the run length encoding process is executed. The various encoded data D(p,n) are mutually unrelated, and the compressed data CD(p,m) are all identical to data D(p,n). That is, the total compressed data CD(p,m) obtained by run length encoding of the coded data D(p,n) of FIG. 7(a) is 6-bytes by 1170 blocks by 3 RGB colors (6-bytes×1170×RGB)=21,060 bytes.

FIG. 7(c) shows run length data RD(p,m) in paired correspondence with compressed data CD(p,m). The value of run length data RD(p,m) is 0×01. The total run length data RD(p,m) obtained by run length encoding of the encoded data D(p,n) of FIG. 7(a) is 1-bytes by 1170 blocks by 3 RGB colors (1-byte×1170×RGB)=3,510 bytes.

When encoded data D(p,n) shown in FIG. 7(a) are run length encoded, the total quantity of compressed data CD(p,m) and run length data RD(p,m) add 7/6 (abut 117%) to the encoded data D(p,m). Thus, when the blocks subjected to run length encoding are mutually unrelated, and when there is not some mutual correspondence, it is most suitable to omit execution of the run length encoding process. In the case of the present copying apparatus, when the total data of the compressed data CD(p,m) and run length data RD(p,m) exceeds a predetermined value, the value of run length data RD(p,1) is replaced by 0, and encoded data D(p,n) and its compressed data CD(p,m) are both saved together as run length data for run length data RD(p,1). Thus, the increase in the data quantity induced by the run length encoding process is suppressed to 1 byte.

When the encoded data D(p,n) are reproduced from the compressed data CD(p,m) and run length data RD(p,m) obtained by the run length encoding process in a manner described later, the compressed data CD(p,m) are repeatedly output by the value of run length data RD(p,m) as data D(p,n). At this time, when the value of the read run length data RD(p,m) is 0, the compressed data CD(p,m) is directly designated encoded data D(p,n).

(3) Image Processing (3-1) Main routine

Figure 9:
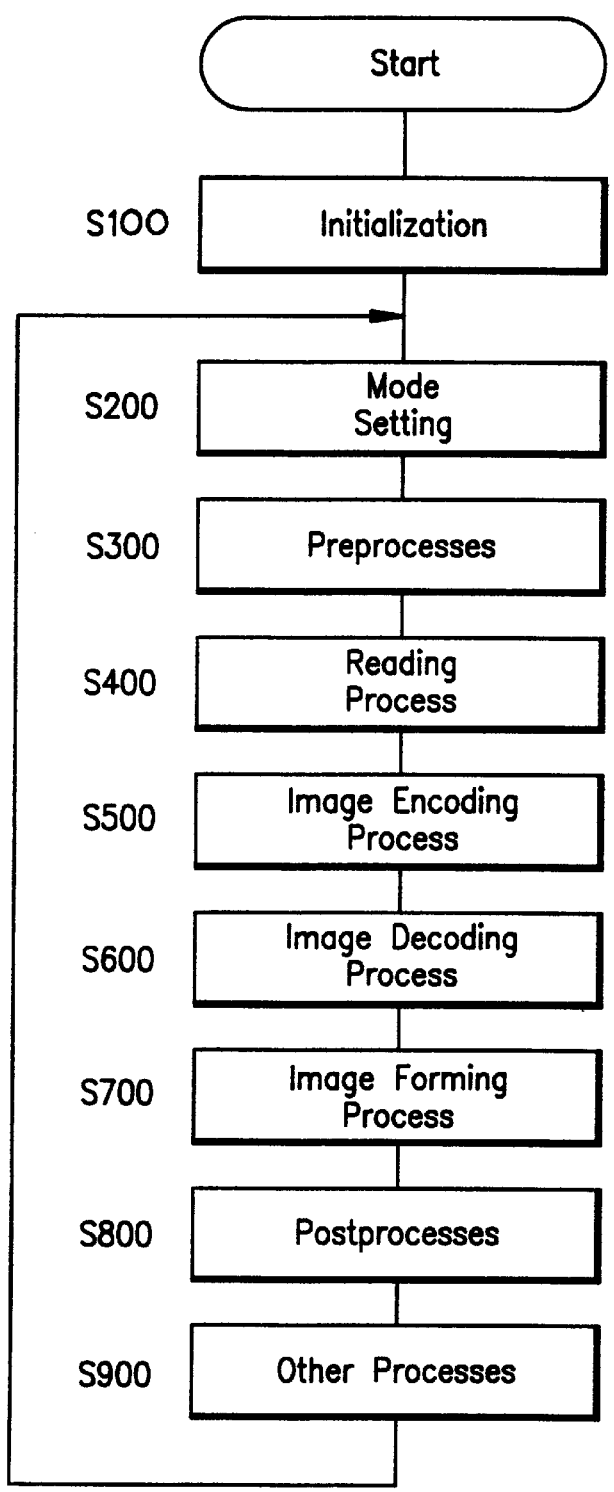
FIG. 9 shows the main routine of the digital color copying apparatus.

FIG. 9 shows the main routine of the image processing executed by the copying apparatus. First, initialization of the copying apparatus is accomplished (step S100). Then, the mode setting process is executed from the operation panel 300 (step S200). Then, preprocessing such as, warm up, shading, and image stabilization processes, are executed (step S300). Thereafter, CPU 611 drives scanner motor 102 so as to read the image data corresponding to a document placed on document platen 107, and the obtained RGB image data are standardized (step S400). The RGB image data of the document are subjected to an encoding process using a GBTC method, and a predetermined run length encoding process (step S500). The contents of the processes executed on the R, G, and B image data are identical.

In the present embodiment, the image encoding process is described in terms of the R component of the image data. Data D (mean value information LA, gradient range exponent LD, code data Φij) obtained by a GBTC encoding method are subjected to a predetermined run length encoding process. The run length encoding process is described later using a flow chart. The compressed data CD obtained by the run length encoding process are stored in compressed image memory 606, and the run length data RD are stored in run length memory 607. Then, in step S600, the encoded data D (mean value information LA, gradient range exponent LD, code data Φij) are reproduced based on the compressed data CD stored in compressed image memory 606 and the run length data RD stored in run length memory 607. The reproduction of data D is accomplished by repeatedly outputting compression data CD corresponding only to run length data RD values.

A GBTC type decoding process is performed on the reproduced data D, to decode the RGB image data. The processes executed for R, G, B image data are identical just as in the case of the image encoding process. In the present embodiment, the image decoding process is described in terms of the R component. An image forming process for forming an image on a paper sheet is executed based on the RGB image data obtained by the decoding process of step S600 (step S700). After the image forming process, processes required for maintaining the condition of the apparatus and which are not directly related to the image forming operation are executed, such as removal of residual toner from photosensitive drum 204 after image formation and the like (step S800). Finally, other processes not directly related to the image forming process of the copying apparatus are executed, such as temperature control of the fixing device, communication controls and the like (step S900).

(3-2) Image Encoding Process (3-2-1) Image Encoding Process

Figure 10:
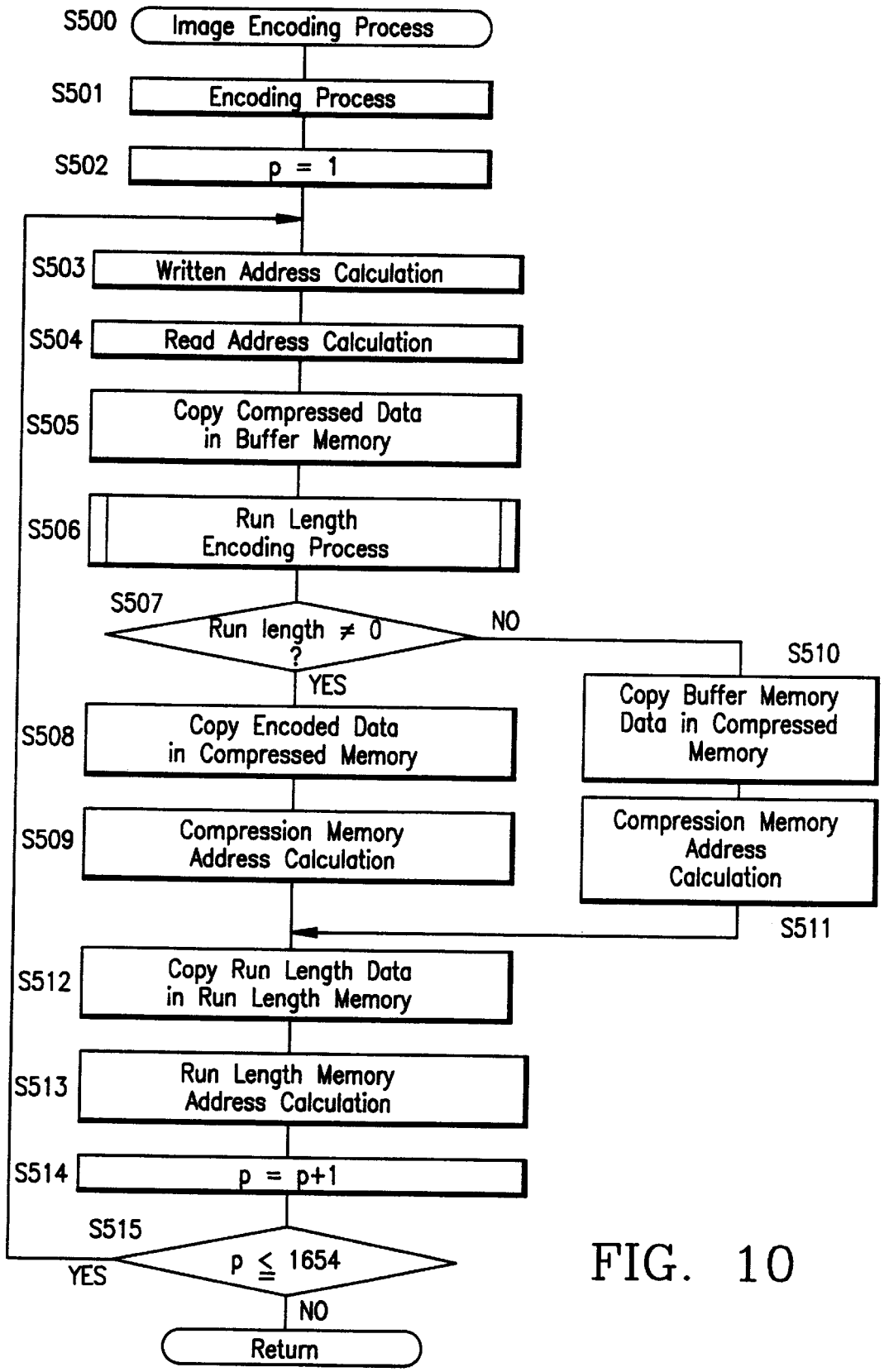
FIG. 10 is a flow chart of the image encoding process.

FIG. 10 is a flow chart of the image encoding process (step S500). This process is executed for the R, G, and B image data. The content of the process is identical for each image data RGB component. In the present embodiment, the encoding process is described in terms of the R component of image data. First, the GBTC method encoding process is executed (step S501). The following process is executed for the encoded data D(p,n) arrayed in each line. The data D(p,n) comprise mean value information LA, gradient range exponent LD, and code data Φij. Parameter p expresses the value of the line address, which in the present embodiment is a value from 1 to 1654. Parameter n expresses the column address, which is a value from 1 to 1170. First, the value of line address p of compression memory 606 is initialized at a value of [1] (step S502). The written address of compressed data CD in compression memory 606 obtained by the run length encoding process is calculated beforehand (step S503). The address of the encoded data D(p,n) read from compression memory 606 is calculated (step S504). This read address is dependent on the value of line address p of compression memory 606. The encoded data D are read out from a predetermined read out start address, and written to buffer memory 607 (step S505). The run length encoding process is then executed (step S506). In the run length encoding process, the data D(p,n) are compressed based on the run length of the black-and-white images of encoded data D(p,n), and predetermined compression data CD(p,m) and run length data RD(p,m) are output. Parameter m expresses the column address of each 1-byte compressed data CD in compressed data buffer memory 609, and expresses the column address of run length data RD in run length buffer memory 610. As previously described using FIG. 8, in the run length encoding process, when there are no consecutive images of the same color among the blocks arrayed in line address p, the value of run length data RD(p,1) is replaced with [0].

After the run length encoding process ends, the value of run length data D(p,1) is checked. When the value of run length data D(p,1) is [1] or greater (step S507: YES), the compressed data CD(p,m) obtained by the run length encoding process are stored in compressed image memory 606 (step S508). Then, the write address in the compression memory is calculated (step S509). This write address is dependent on the value of the column address m of compressed data CD(p,m). On the other hand, when the value of run length data RD(p,1) is [0] (step S507: NO), the data D(p,n) in buffer memory 608 are stored in compressed image memory 606 (step S510). Then, the write address in the compression memory is calculated (step S511). The write address is dependent on the value of the column address n of data D(p,n). The run length data RD(p,m) are stored in run length memory 607 (step S512). Then, the write address in run length memory 607 is calculated (step S513). Write address is dependent on the value of column address m. The value of line address p is incremented [1] (step S515). When the value of line address p is less than the last line 1654 (step S514: YES), the processes of steps S503 through S514 are repeated. When the value of line address p is greater than 1654 (step S515: NO), the process ends and the routine returns.

(3-2-2) Run Length Encoding Process

Figure 11:
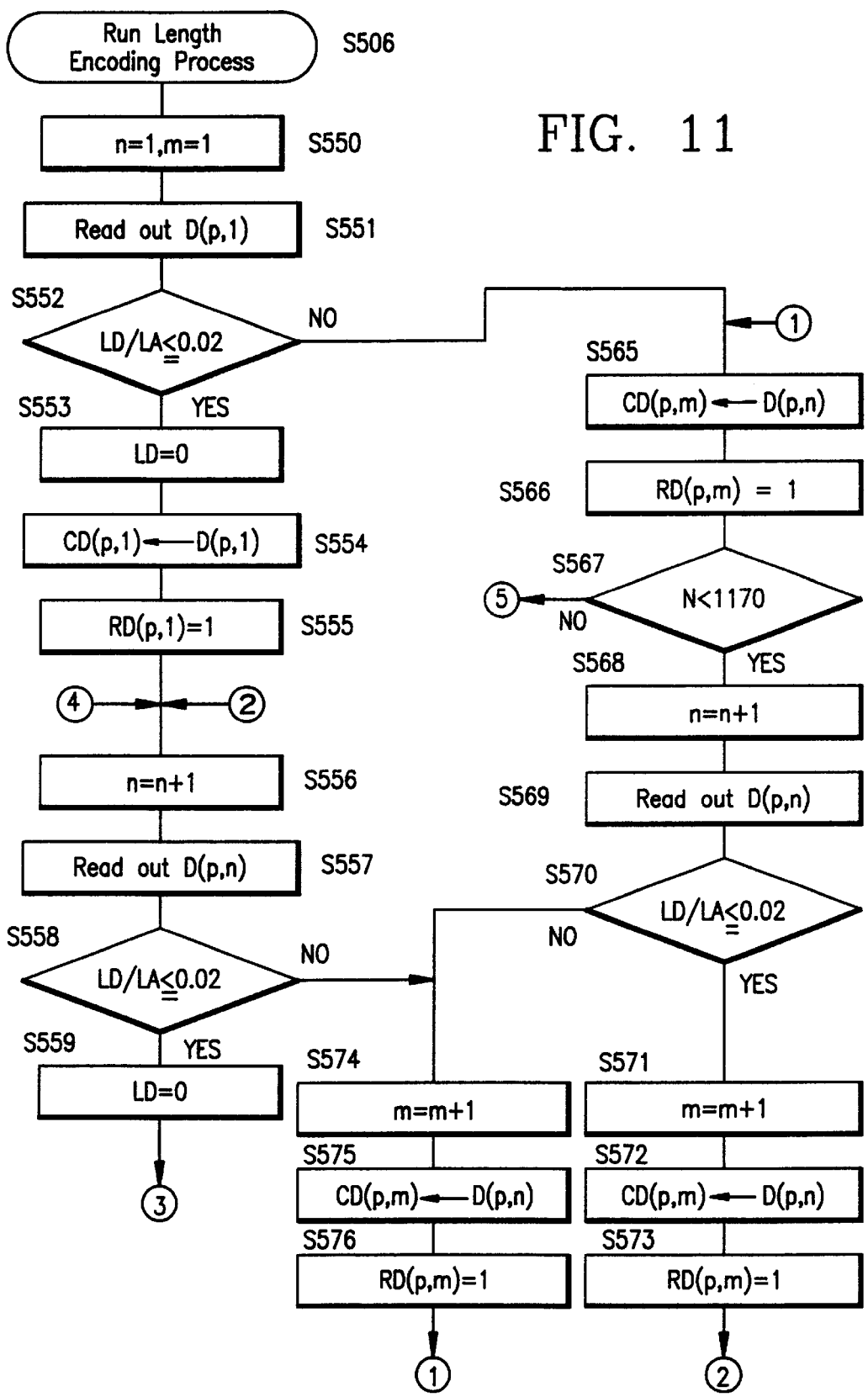
FIGS. 11 and 12 are flow charts of the run length encoding process.
Figure 12:
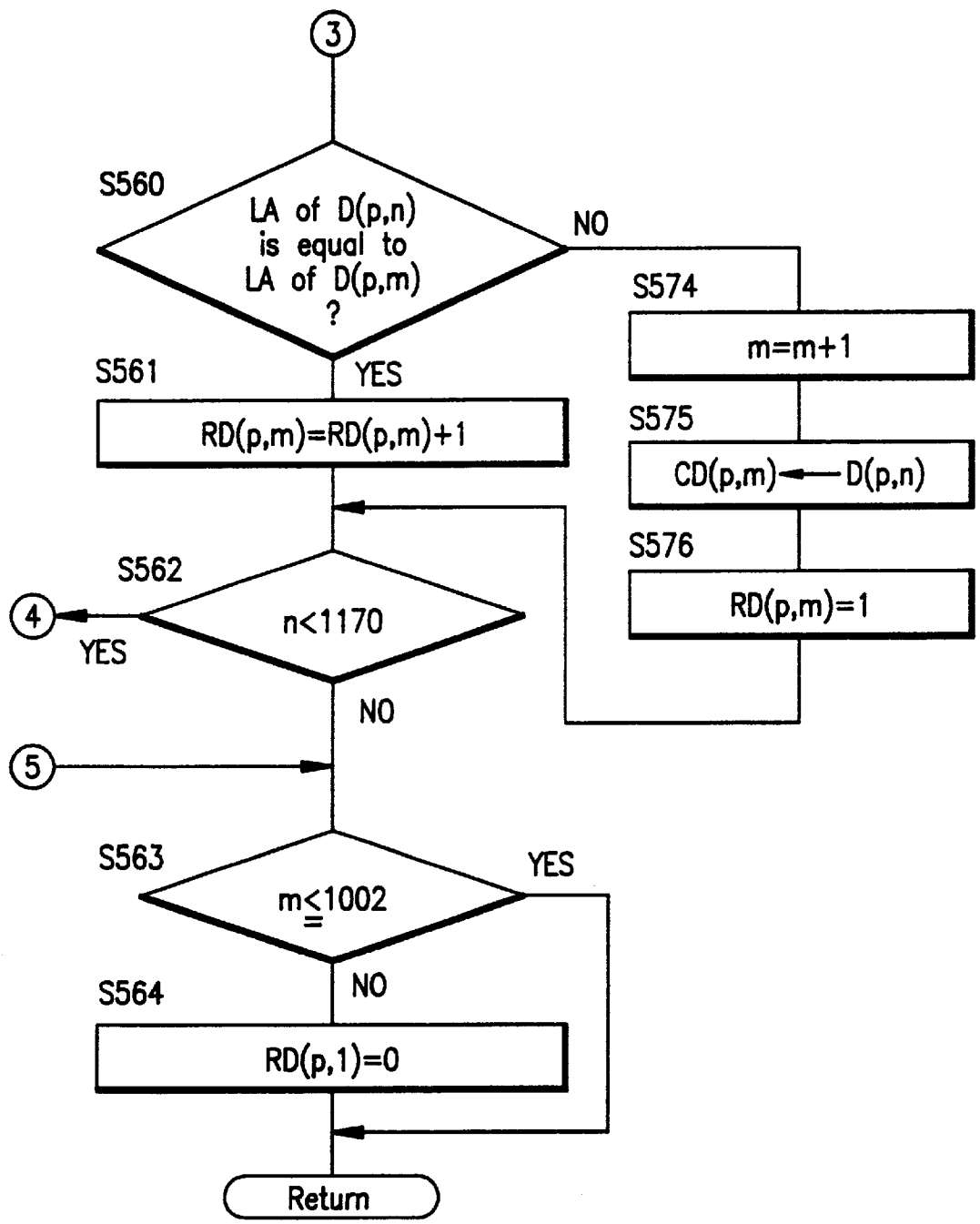

FIGS. 11 and 12 are flow charts of the run length encoding process (step S506). First, the values of column addresses n and m of data D(p,n), compressed data CD(p,m), and run length data RD(p,m) are initialized at a value of [1] (step S550). The encoded data D(p,1) are read out from buffer memory 608 (step S551). The block of said data D(p,1) is discriminated as related to a solid image when the gradient range exponent LD of the read data D(p,1) divided by mean value information LA, is less than 0.02 (step S552: YES). This reference value of 0.02 is a value set by estimating the generated dispersion of about 2% of desired data when image data of a document of uniform density are read by reading unit 100. In the copying apparatus of the present embodiment, when the value of gradient range exponent LD divided by mean value information LA is less than 0.02, the image of the document is determined to be of uniform density.

When the block of data D(p,1) is discriminated as related to a solid image, a check is made to determine whether or not the next block is an image of the same density.

First, the value of gradient range exponent LD is set at [0] to improve the reproducibility of the solid image (step S553). The image data obtained by the GBTC encoding process are all rendered as the same value by setting the gradient range exponent LD at [0]. Then, the encoded data D(p,1) are written to compressed data buffer memory 609 as compressed data CD(p,1) (step S554). Run length data RD(p,1) of value 1 are written to run length buffer memory 610 (step S555). The value of column address n is incremented [1] to check whether or not the image of the next block is a solid image (step S556). The encoded data D(p,n) are read out from buffer memory 608 (step S557). The gradient range exponent LD of the read data D(p,n) is determined by dividing by mean value information LA, and when the determined value is less than 0.02 (step S558: YES), the block of data D(p,n) is discriminated as related to a solid image and the following process is executed.

First, the value of gradient range exponent LD is set at [0] to improve reproducibility of the solid image (step S559). Then the routine continues to step S560 shown in FIG. 1 2. When the value of mean value information LA of data D(p,n) and the value of mean value information LA of compressed data CD(p,m) are equal (step S560: YES), the block of data D(p,n) and the block directly before this block are discriminated as related to solid images of the same density. In this case, the value of run length data RD(p,m) written in run length buffer memory 610 is incremented by 1 (step S561). When the value of value of mean value information LA of data D(p,n) and the value of mean value information LA of compressed data CD(p,m) are different (step S560: NO), the block of data D(p,n) and the block directly before this block are discriminated as solid images of dissimilar densities. In this case, the value of the column address m is incremented [1] (step S574), and the data D(p,n) are written to compressed data buffer memory 609 as the next compressed data CD(p,m) (step S575). The run length data RD(p,m) of value 1 corresponding to the new compressed data CD(p,m) are written to run length buffer memory 610 (step S576). When the value of column address n is a value less than 1170 specifying the last column (step S562: NO), the routine returns to step S556 shown in FIG. 11.

In step S552 shown in FIG. 11, when the value gradient range exponent LD of data D(p,1) divided by mean value information LA is a value 0.02 or greater, the block of data D(p,1) is determined to be unrelated to a solid image, and the routine moves to the determination of whether or not the next block is related to a solid image. First, the data D(p,n) are written to compressed data buffer memory 609 as compressed data CD(p,m) (step S565). The run length data RD(p,m) of value 1 is written to run length buffer memory 610 (step S566). When the value of column address n is less than 1170 (step S567: YES), the value of column address n is incremented by [1] (step S568). The data D(p,n) are read out from buffer memory 608 (step S569). When the value of gradient range exponent LD of data D(p,n) divided by mean value information is less than a value of 0.02 (step S570: YES), the block of said data D(p,n) can be discriminated as related to a solid image. The value of column address m of compressed data CD(p,m) is incremented by [1] (step S571), and data D(p,n) are written to compressed data buffer memory 609 as compressed data CD(p,m) (step S672). After the run length data RD(p,m) of value 1 corresponding to the aforesaid data are written to run length buffer memory 610 (step S573), the routine continues to step S556.

In step S567 shown in FIG. 11, when the value of column address n is 1170 specifying the final column (step S567: NO), the routine continues to step S563 shown in FIG. 12.

In step S570 shown in FIG. 11, when the value of gradient range exponent LD of read data D(p,n) divided by mean value information LA is greater than 0.02 (step S570: NO), the block of data D(p,n) is discriminated as unrelated to a solid image. After the value of column address m is incremented by [1] (step S574), the data D(p,n) are written to compressed data buffer memory 609 as compressed data CD(p,m) (step S575), and the run length data RD(p,m) of value 1 are written to run length buffer memory 610 (step S576), and thereafter the routine continues to step S556.

In step S562 shown in FIG. 12, when the value of column address n is 1170 specifying the final column (step S562: NO), it is determined that the run length encoding process for line p has ended, and a check is made to determine whether or not the compression ratio of the image data has improved. Improvement of the image data compression ratio requires that the total data value of each 6-bytes of compressed data CD(p,m) and each 1-byte of run length data RD(p,m) obtained by the run length encoding process is less than the data quantity of the various 6-bytes of data D(p,n) encoded by the GBTC method. This requires that the maximum value of column address m of compressed data CD(p, m) satisfies equation 5 below.

$$(6+1) \times m < 6 \times 1170$$

$$m < 1002.8 \qquad \text{Eq. 5}$$

That is, when the maximum value of column address m of compressed data CD(p,m) is equal to or less than 1002, the total value of compressed data CD(p,m) and run length data RD(p,m) is less than the data quantity of data D(p,n) encoded by the GBTC method.

When the maximum value of column address m is less than 1002 (step S563: YES), the process directly ends. When, however, the maximum value of column address m is greater than 1002 (step S563: NO), the value of run length data RD(p,1) is set at [0] which is not the normal setting (step S564).

When compressed data CD(p,m) are written to the compressed image memory after the run length encoding process ends as previously described, the value of run length data RD(p,1) is checked. When the value of run length data RD(p,1) is 1 or greater, the compressed data CD(p,m) written to compressed data buffer 609 are stored in compressed image memory 606, and the run length data RD(p,m) written in run length buffer memory 610 are written to run length memory 607. When, however, the value of run length data RD(p,1) is 0, the data D(p,n) written to buffer memory 606 are written to compressed image memory 606, and only the run length data RD(p,1) written in run length buffer memory 610 are written to run length memory 607.

(303) Image Decoding Process

Figure 13:
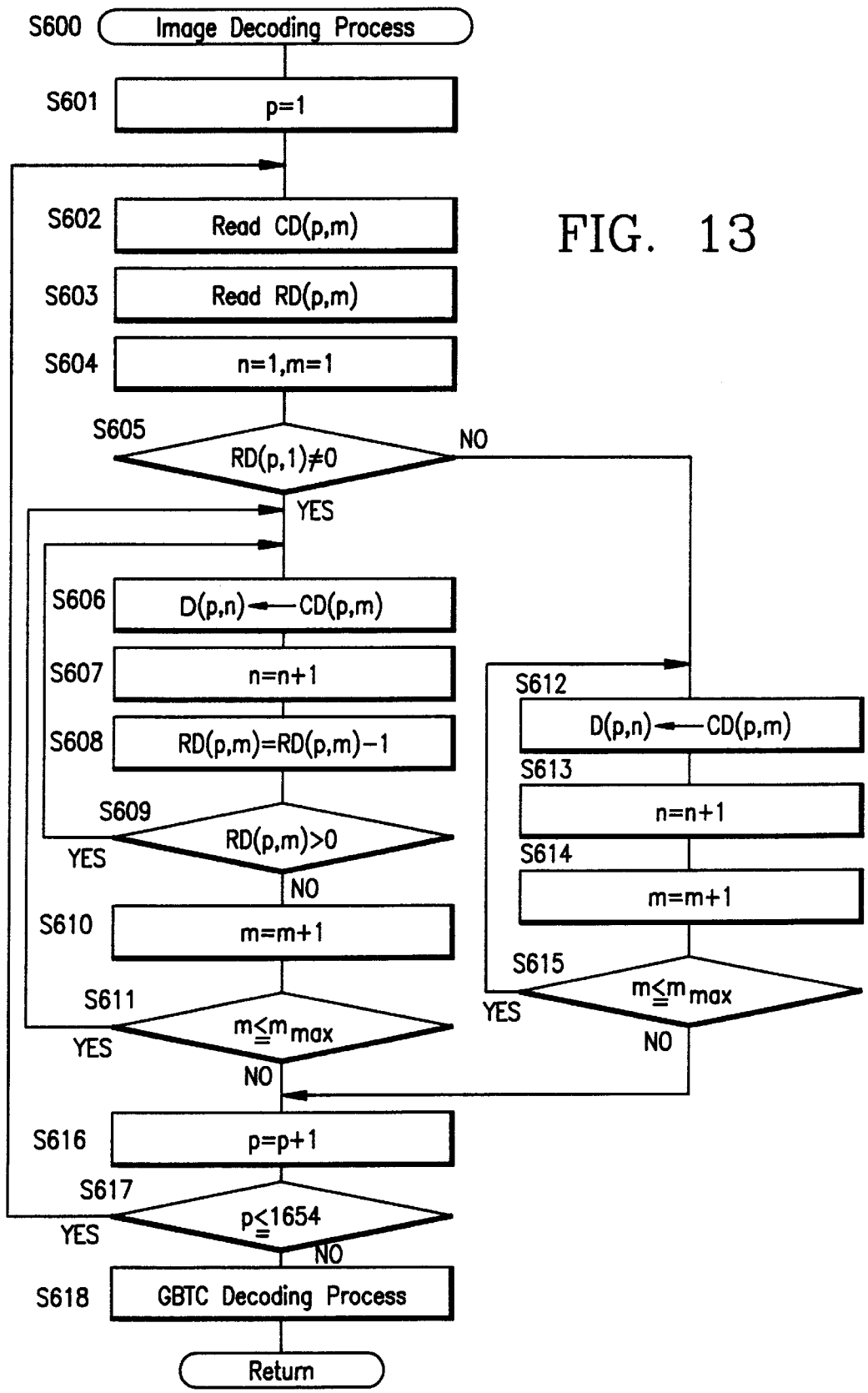
FIG. 13 is a flow chart of the image decoding process.

FIG. 13 is a flow chart of the image decoding process (step S600). The image decoding process reads the compressed data CD and run length data RD related to R, G, B image data stored in memories 605, 620, 640, so as to reproduce the respective encoded data D, and decode the image data from said reproduced data D. The processes executed to decode the R, G, B image data have identical contents. In the present embodiment, the process for decoding the R component image data is described.

The essentials of this process are described below. The compressed data CD(p,m) written in compressed image memory 606 are read out to compressed data buffer memory 609, and the run length data RD(p,m) written in run length memory 607 are read out to run length buffer memory 610. The original decoded data D(p,n) are reproduced for each line address based on the aforesaid data. Thereafter, the GBTC method decoding process is executed, and the encoded data D(p,n) are decoded to R component image data.

First, the value of line address p is initialized at a value of 1 (step S601). Then, the compressed data CD(p,m) is read from compressed image memory 606 and written to compressed data buffer memory 609 (step S602). The run length data RD(p,m) are read from run length memory 607 and written to run length buffer memory 610 (step S603). The value of column addresses n and m of the various data are initialized at 1 (step S604). When the value of the run length data RD(p,1) is other than [0] (step S605: YES), the run length encoding process is determined to have been executed, and the following process is executed.

The value of compressed data CD(p,m) is written to compressed data buffer memory 609 as encoded data D(p,n) (step S606). The value of column address n of the encoded data is incremented by 1 (step s607). When the value of the run length data RD(p,m) is 1 or greater (step S609: YES), the processes of steps S606 through S608 are repeated. When the value of the run length data RD(p,m) is 0 (step S609: NO), the value of column address m of compressed data CD(p,m) is incremented 1 (step S610). When the value of column address m is less than a maximum value $m_{max}$ (step S611: YES), the routine returns to step S606, and the processes of steps S606 through S610 are repeated. When the value of column address m obtained by the process of step S610 is greater than $m_{max}$ (step S611: NO), it is determined that the reproduction process is completed for the decoded data D(p,n) of line p.

When the value of run length data RD(p,1) is 0 in step s605 (step S605: NO), the data quantity of compressed data CD(p,m) and run length data RD(p,m) obtained by the run length encoding process is greater than the data quantity of encoded data D(p,n) and, therefore, the run length encoding process is canceled. Accordingly, the compressed data CD(p,m) read from buffer memory 608 are used directly as encoded data D(p,n), and the following process is executed.

The compressed data CD(p,m) are written to buffer memory 608 as encoded data D(p,n) (step S612). The value of column address n is incremented 1 (step S613). The value of column address m is incremented by 1 (step S614). When the value of column address m incremented by 1 via the process of step S614 is less than $m_{max}$ (step S615: YES), the processes of steps S612 through S614 are repeated. When the value of column address m obtained by the process of step S614 is greater than $m_{max}$ (step S615: NO), it is determined that the reproduction process of the decoded data D(p,n) of line p is completed.

After reproduction process is completed for the data D(p,n) of line p, the value of line address p is incremented by 1 so as to reproduce the encoded data D(p,n) of the next line (step S616). When the value of the line address is equal to or less than 1654 specifying the final line (step S617: YES), the routine returns to step S602, and the processes of steps S602 through S616 are repeated. When the value of line address p is a value larger than 1654 specifying the final line (step S617: NO), it is determined that the reproduction process is completed for decoded data D(p,n) of the data of the entire document. Then, the RGB image data are decoded based on the encoded data D(p,n), i.e., mean value information LA, gradient range exponent LD, code data Φij, by executing the GBTC method decoding process (step S618).

According to the image processing apparatus (digital color copying apparatus) of the present invention as described above, the image data of each block obtained by an encoding process in an encoding process unit can be compressed by executing a run length encoding process via a run length encoding process. The memory unit stores compressed data and run length data obtained by the run length encoding process. Furthermore, processing time can be reduced, and the memory capacity required for processing can be reduced by the execution of discrimination by the discrimination unit based on the gradient range exponent and mean value information of each block obtained by the encoding process, as compared to discrimination based on data before the encoding process. When a solid image is discriminated, reproduction of the solid image can be improved by replacing [0] for the gradient range exponent.

In addition, greater efficiency in image data compression can be realized by providing a comparison unit and using the mean value information, gradient range exponent and code data of each block before the run length encoding process when the total value of compressed data and run length data obtained by the run length encoding process is determined to be greater than the total value of the mean value information, gradient range exponent, and code data of each block before the run length encoding process.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of image processing, comprising the steps of:
   allocating image data of a document into a plurality of blocks of a predetermined pixel matrix;
   determining a gradient range exponent and a mean value information for each of the blocks based on the image data contained in each of the blocks;
   encoding the image data of each pixel of each of the blocks into code data based on said mean value information and gradient range exponent for the respective block so that the code data defines each pixel with fewer gradation levels than the image data;

determining whether or not a mutually adjoining block is related to a solid image of a same density relative to a block subject to the encoding process; and executing a run length encoding process for a batch of mean value information, gradient range exponent, and code data based on a run length of adjoining blocks discriminated as related to a solid image of the same density.

2. The method of claim 1, wherein the code data represents four gradation levels.

3. The method of claim 2, wherein the predetermined pixel matrix includes sixteen pixels, and the code data is sixteen bytes per block, which includes average value information of eight bits, a gradation range index of eight bits, and thirty two bits representing pixel information.

4. The method of claim 1, wherein a block is determined to be a solid image when the gradient range exponent divided by the mean value information for a block is less than a predetermined value.

5. The method of claim 4, wherein the predetermined value is less than 2%.

6. The method of claim 1 further comprising the step of setting the gradient range exponent to zero when the gradient range exponent divided by the mean value information for a block is less than a predetermined value.

7. The method of claim 6, wherein the pre determined value is less than 2%.

8. The method of claim 1, wherein the run length encoding process calculates a length of a run of blocks of the same density.

9. The image processing device of claim 1 wherein the code data represents four gradation levels.

10. The image processing device of claim 9, wherein the predetermined pixel matrix includes sixteen pixels, and the code data is sixteen bytes per block, which includes average value information of eight bits, a gradation range index of eight bits, and thirty two bits representing pixel information.

11. A method of image processing, comprising the steps of:

allocating image data of a document into a plurality of blocks of a predetermined pixel matrix;

determining a gradient range exponent and a mean value information for each of the blocks based on the image data contained in each of the blocks;

encoding the image data of each pixel of each of the blocks into code data based on said mean value information and gradient range exponent for the respective block so that the code data defines each pixel with fewer gradation levels than the image data;

determining whether or not a mutually adjoining block is related to a solid image of a same density relative to a block subject to the encoding process;

executing a run length encoding process for a batch of mean value information, gradient range exponent, and code data based on a run length of adjoining blocks discriminated as related to a solid image of the same density;

storing in a memory unit compress ion data and run length data obtained by the run length encoding process;

comparing a total value of the run length data and compressed data obtained by the run length encoding process with the mean value information, the gradient range exponent, and the code data of each block prior to the run length encoding process; and storing in the memory unit the mean value information, the gradient range exponent, and the code data for each block prior to the run length encoding process when the total value of the run length data and the compressed data obtained by the run length encoding process is greater than a total value of the mean value information, the gradient range exponent, and the code data of each block prior to the run length encoding process based on the comparing result.

12. The method of claim 11, wherein the run length encoding process calculates a length of a run of blocks of the same density.

13. The method of claim 11, wherein a block is determined to be a solid image when the gradient range exponent divided by the mean value information for a block is less than a predetermined value.

14. The method of claim 13, wherein the predetermined value is 2%.

15. An image processing device, comprising:

an encoding processing unit for allocating image data of a document into a plurality of blocks of a predetermined pixel matrix, determining a gradient range exponent and a mean value information for each of the blocks based on the image data contained in each of the blocks, and encoding the image data of each pixel of each of the blocks into code data based on said mean value information and gradient range exponent for the respective block so that the code data defines each pixel with fewer gradation levels than the image data;

a discrimination unit for determining whether or not a mutually adjoining block is related to a solid image of a same density relative to a block subject to the encoding process; and a run length encoding process unit for executing a run length encoding process for a batch of mean value information, gradient range exponent, and code data based on a run length of adjoining blocks discriminated as related to a solid image of the same density.

16. The image processing device of claim 15, wherein a block is determined to be a solid image when the gradient range exponent divided by the mean value information for a block is less than a predetermined value.

17. The image processing device of claim 16, wherein the predetermined value is 2%.

18. The image processing device of claim 15, wherein the gradient range exponent is set to zero when the gradient range exponent divided by the mean value information for a block is less than a predetermined value.

19. The image processing device of claim 18, wherein the predetermined value is less than 2%.

20. The image processing device of claim 15, wherein the run length encoding process unit calculates a length of a run of blocks of the same density.

21. An image processing device, comprising:

an encoding processing unit for allocating image data of a document into a plurality of blocks of a predetermined pixel matrix, determining a gradient range exponent and a mean value information for each of the blocks based on the image data contained in each of the blocks, and encoding the image data of each pixel of each of the blocks into code data based on said mean value information and gradient range exponent for the respective block so that the code data defines each pixel with fewer gradation levels than the image data;

a discrimination unit for determining whether or not a mutually adjoining block is related to a solid image of a same density relative to a block subject to the encoding process;

a run length encoding process unit for executing a run length encoding process for a batch of mean value information, gradient range exponent, and code data based on a run length of adjoining blocks discriminated as related to a solid image of the same density;

a memory unit for storing in a memory unit compression data and run length data obtained by the run length encoding process;

a comparator unit for comparing a total value of the run length data and compressed data obtained by the run length encoding process with the mean value information, the gradient range exponent, and the code data of each block prior to the run length encoding process; and means for storing in the memory unit the mean value information, the gradient range exponent, and the code data for each block prior to the run length encoding process when the total value of the run length data and the compressed data obtained by the run length encoding process is greater than a total value of the mean value information, the gradient range exponent, and the code data of each block prior to the run length encoding process based on the comparing result.

22. The image processing device of claim 21, wherein a block is determined to be a solid image when the gradient range exponent divided by the mean value information for a block is less than 2%.

23. The image processing device of claim 21, wherein the predetermined value is 2%.

24. The image processing device of claim 21, wherein the run length encoding process calculates a length of a run of blocks of the same density.

* * * * *